Feb. 25, 1958     R. A. BROWN     2,825,002
LIGHT PULSE PRODUCING APPARATUS
Filed Sept. 22, 1953     5 Sheets-Sheet 1

INVENTOR.
ROBERT A. BROWN
BY
John H. Lewis Jr.
ATTORNEYS

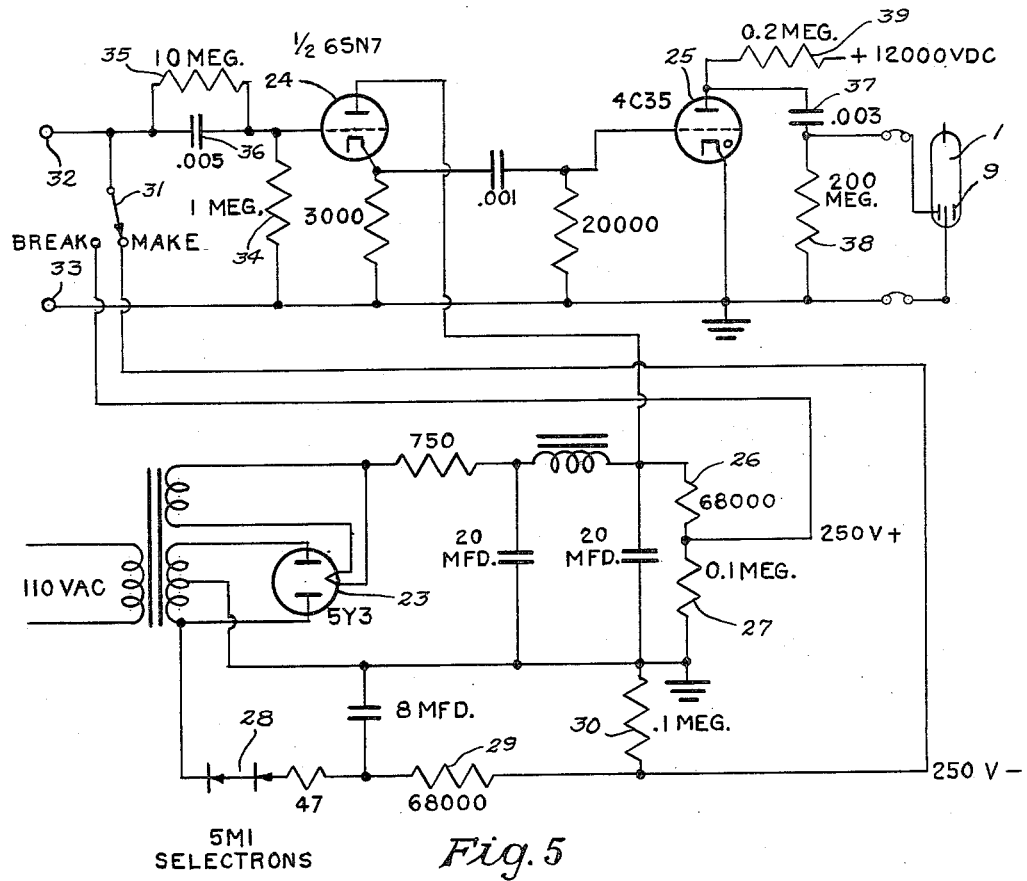
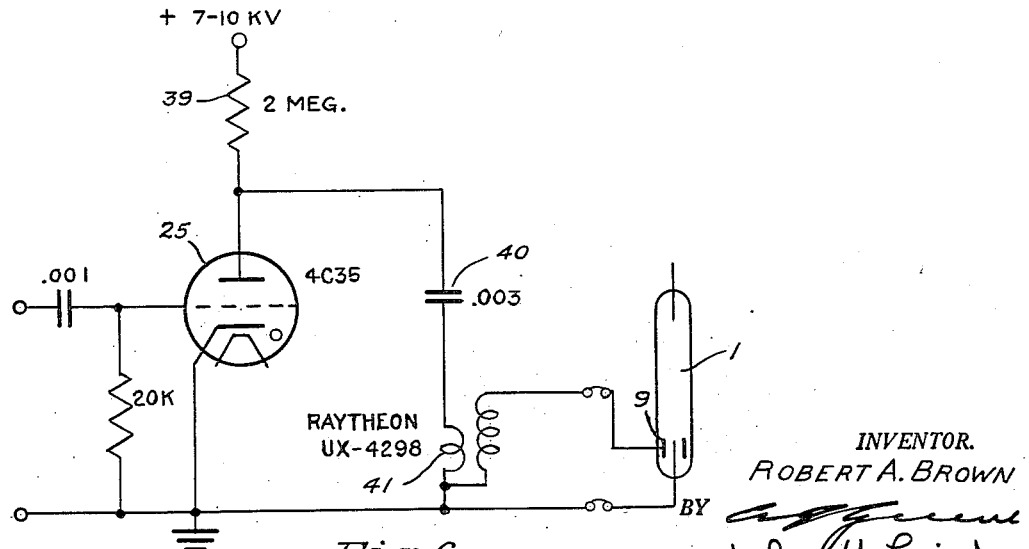

Feb. 25, 1958 R. A. BROWN 2,825,002
LIGHT PULSE PRODUCING APPARATUS
Filed Sept. 22, 1953 5 Sheets-Sheet 3

INVENTOR.
ROBERT A. BROWN
BY
ATTORNEYS

Feb. 25, 1958  R. A. BROWN  2,825,002
LIGHT PULSE PRODUCING APPARATUS
Filed Sept. 22, 1953  5 Sheets-Sheet 5
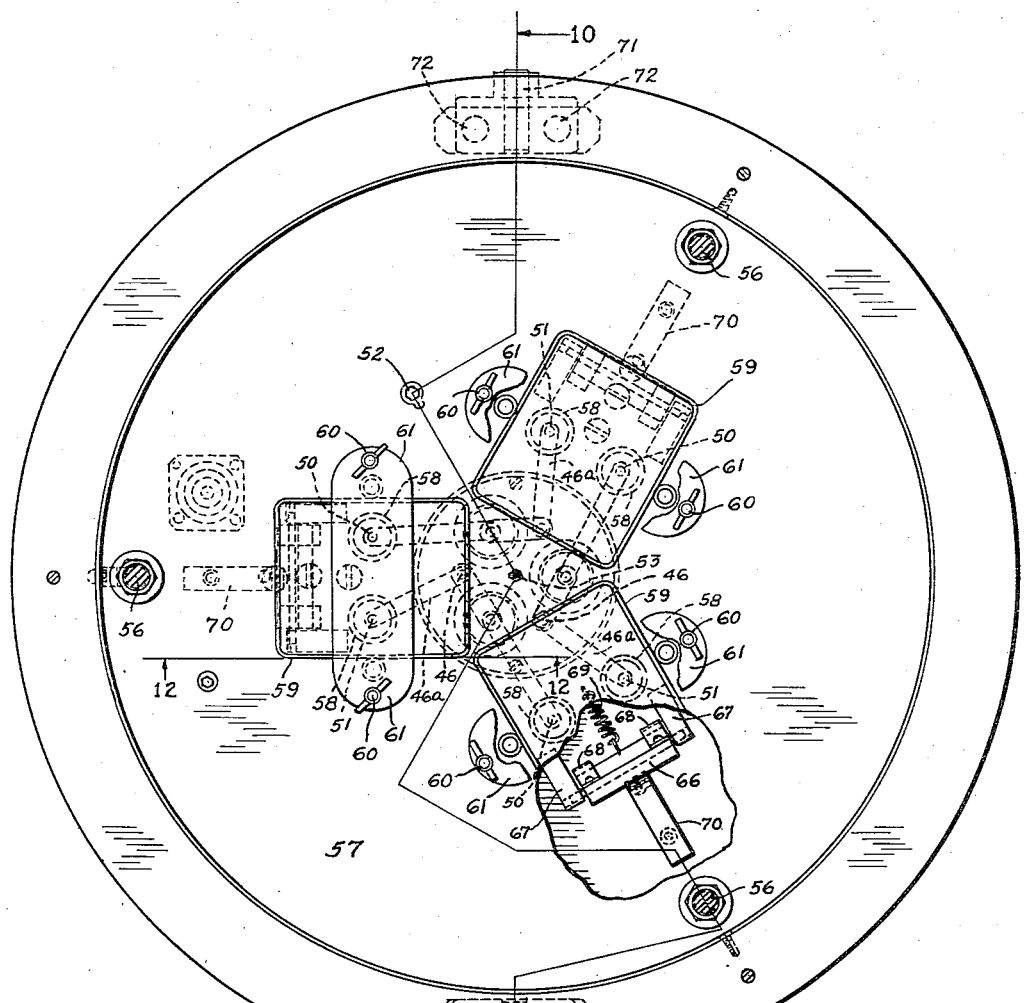
Fig.11
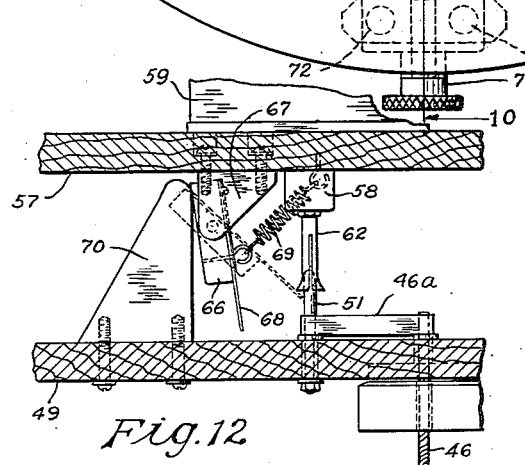
Fig.12
INVENTOR.
ROBERT A. BROWN
BY
ATTORNEYS "# United States Patent Office 2,825,002
Patented Feb. 25, 1958

2,825,002
LIGHT PULSE PRODUCING APPARATUS

Robert A. Brown, Milford, Conn., assignor to Remington Arms Company, Inc., Bridgeport, Conn., a corporation of Delaware Application September 22, 1953, Serial No. 381,688

2 Claims. (Cl. 315—166)

This invention relates to the production of high intensity light pulses of very short time duration.

The principal object of this invention is to improve upon present gaseous discharge flash lamp practice by:

(1) Providing for the emission of greater than customary amounts of light without increasing the time duration of light emission.

(2) Providing for the emission of usual amounts of light in less than usual periods of time.

(3) lowering the voltage which must be provided for a desired light emission and thereby simplifying power supply and steady state insulation requirements.

(4) Providing for perfect synchronization of the simultaneous emission of light from a number of individual gaseous discharge flash tubes.

In its simplest form, my invention consists in the provision of a series circuit in which a plurality of gaseous discharge flash lamps alternate in a series circuit with an equal number of energy storage capacitors, each of those capacitors being charged to a potential only slightly less than the flash-over potential of any lamp in the circuit. Below their flash-over voltage, the lamps themselves are not normally conductors of electricity so that each lamp produces in effect a discontinuity in the circuit, but the series circuit of alternate lamps and capacitors is not otherwise interrupted at any point or at any time. I provide trigger means to initiate the discharge in one of the discharge lamps in the series and means to also cause the remainder of the lamps in the series to be initiated in sequence. Sequential ignition of the lamps occurs rapidly at a fraction of a microsecond/lamp, but the current during sequential ignition is limited and the light emitted during this interval is photographically inconsequential. Once all lamps have been ignited, the main photographic discharge takes place. Since the lamps are then discharging in a series path, the emission of light may then be considered to be simultaneous.

The remainder of my invention consists in the provision of means to recharge the energy storage capacitors and in certain mechanical features useful in the production of practicable working models of the device.

The exact nature of my invention as well as other objects and advantages thereof will become apparent from consideration of the following specification referring to the attached drawings, in which:

Fig. 5 is a schematic diagram of one type of trigger circuit which may be employed.

Fig. 6 is a schematic diagram of a modification of the pulse generating portion of a trigger circuit such as that shown in Fig. 5.

Fig. 11 is a cross-sectional view on the line 11—11 of Fig. 10.

Fig. 12 is a partial sectional view on the line 12—12 of Fig. 11.

Basic circuit

Figure 1:
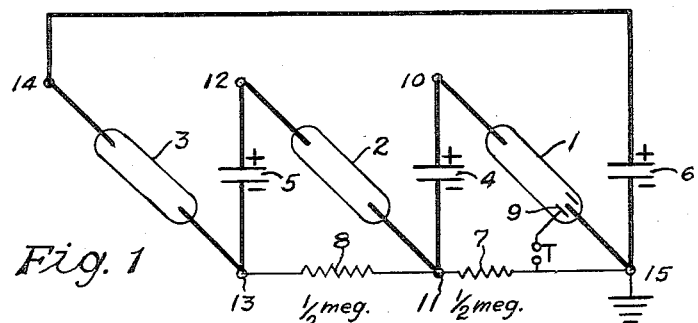
Fig. 1 is a schematic diagram of a rudimentary electrical circuit for cascade flash tubes.

Referring to Fig. 1, it can be seen that in its simplest form my invention consists of a continuous series circuit shown in the heavy lines in which any desired number of substantially identical gaseous discharge flash lamps 1, 2, and 3 alternate with substantially identical charged capacitors 4, 5, and 6. Coupling resistors 7 and 8 of fairly high value are provided to assist in initiating discharge, as will be later described, and at least one of the lamps should be provided with a trigger electrode 9.

In a typical arrangement, the flash lamps have been Mullard LSD-2 flash tubes, produced by the British firm of Mullard Wireless, Ltd. These lamps will not ionize or become electrically conductive unless triggered, or unless the votage between their anode and cathode rises above about 11.0 kilovolts. In an area free from electrical disturbances of any kind, their flash-over voltage may be somewhat higher. These exemplary lamps will readily discharge when voltage pulses of 12.0 kilovolts or somewhat less are applied between the triggering electrode and the adjacent cathode to ionize the gas within the tube.

The exemplary use of this particular flash tube, however, is not a limiting factor, as the same principles will apply to any other gaseous discharge flash lamps. Exemplary capacitors have been those having plastic film dielectrics and working voltage ratings on the order of 12 kilovolts D. C., with capacity up to 1.0 microfarad as about a top limit with the exemplary flash tubes. In the exemplary simple circuit, each capacitor should be considered to be charged to a high voltage less than the flash-over voltage of the particular flash lamps but more than about two-thirds the flash-over voltage of the lamps. For example, I have worked with voltages ranging from 7.5 to 11.0 kilovolts on the capacitors, with lamps having flash-over voltages in the range from about 11.0 kilovolts to about 12.5 kilovolts.

In considering the operation of this simple circuit, it will be convenient to consider it in three phases—a charged phase, a sequential triggering phase, and a full conduction phase—and these phases will be considered in order.

Charged phase

In this phase, each capacitor is considered to be charged to a voltage between about two-thirds and slightly less than one times the flash-over voltage of the lamps and the lamps are all in a non-conductive state. The capacitors will, except for leakage, tend to remain charged indefinitely and the losses may be readily made up from suitable charging means to be discussed in more detail later. The coupling resistors 7 and 8 are not significant at this point in the operation, although they do serve to maintain a common level of potential for the cathodes of all flash lamps and for one electrode of each capacitor."

In this condition the unit is ready and waiting to provide a pulse of light.

*Sequential triggering phase*

When a pulse of light is desired, a suitable trigger circuit and pulse generator, to be later described, functions to apply a voltage pulse to a trigger electrode 9 of one of the flash lamps, for example 1, causing a small arc to appear between the trigger electrode and the adjacent cathode of that tube. The ions created by this arc are drawn to the anode of the tube by the positive potential applied to the anode from capacitor 4. In flight through the gaseous atmosphere within the tube, these ions collide with unionized gas particles creating additional ions which join in the migration. Current flow $I_1$ through the lamp 1, however, is limited by resistor 7, with the result that the actual voltage across capacitor 4 falls off very little. The ionization of lamp 1, however, acts as the closing of a switch placing capacitors 4 and 6 in a series circuit that can be traced from point 15 through capacitor 6, lamp 3, resistor 8, capacitor 4, ionized lamp 1, and back to point 15. Since lamp 3 is not ionized and acts as an open circuit, the full voltage of capacitors 4 and 6 minus the voltage drop across lamp 1 $(2V-I_1R_1)$, where $I_1$ is the limited current and $R_1$ is the resistance of the ionized lamp, is applied across lamp 3. Because neither lamp 2 nor lamp 3 is yet conducting, resistor 8 has no current passing through it and consequently has the same potential at each end.

Since the voltage thus applied across lamp 3 is nearly twice its hold-off value, it immediately ionizes and begins to conduct current. This current is limited, as in the case of lamp 1, by the presence of resistor 8 and we now have two "keep alive" circuits operating. The first can be traced from point 15 through lamp 1, capacitor 4, resistor 7, and back to point 15. The second "keep alive" circuit can be traced from point 15 through capacitor 6, lamp 3, resistor 8, capacitor 4, lamp 1, and back to point 15, with a parallel path from point 11 through resistor 7 to point 15.

The ionization of lamp 3, however, acts as the closing of a second switch, adding capacitor 5 to the first two in a circuit that can now be traced from point 15 through capacitor 6, lamp 3, capacitor 5, lamp 2, capacitor 4, lamp 1, and back to point 15. Since lamp 2 is not yet ionized and acts as an open circuit, the full voltage of capacitors 4, 5, and 6, minus the voltage drops across lamps 1 and 3, is applied across lamp 2. The voltage $(3V-I_1R_1-I_2R_2)$ is nearly three times the hold-off voltage of lamp 2 and it ionizes immediately.

This sequence may be continued for any desired number of cascade stages without change in operation. Although necessarily a sequential operation, it is very fast and emits an inconsequential amount of light. Insofar as utilization of light is concerned, the flash tubes may be assumed to pass through this stage substantially simultaneously.

*Full conduction stage*

Once all the lamps in the cascade have been ionized, the main discharge path, which is the circuit shown in heavy lines in each of Figs. 1 through 4, has been prepared. This path, it will be seen, consists of two, three, or any other number of flash tubes and an equal number of capacitors alternately arranged in a closed series circuit. The total voltage in the circuit is equal to V times the number of capacitors less the voltage equivalent of the small amounts of energy used to trigger the flash tubes. Opposing this voltage there is only the sum of the IR drops in the various flash lamps and connectors.

As gas-filled tubes of the type suitable for flash lamps have negative resistance characteristics, the effective lamp resistances decrease to a very low value and the current rises very rapidly to several thousand amperes. While the capacitors are discharging, the stored energy is dissipated in a very short intense flash of light simultaneously emitted from each of the flash lamps in the series. The coupling resistors 7 and 8 are of such a high value in comparison with the very low resistance of the conducting flash lamps that they can be disregarded in considering the full conduction phase of the operation.

The light energy which is released is the same as the total light which would be released by the simultaneous discharge from the same voltage of the same number of flash tubes each operated in a conventional single stage circuit with its own supply capacitor. As a practical matter, however, it would be difficult, if not impossible, to synchronize single stage circuits with an accuracy sufficient to permit their use for very short exposures, while with my circuit, synchronization of any desired number of flash tubes is automatic, and so accurate that a single pulse of light of duration of one microsecond or less does not show intensity peaks or discernible fluctuations in intensity attributable to the number of lamps so used.

*Circuit performance*

Figure 7:
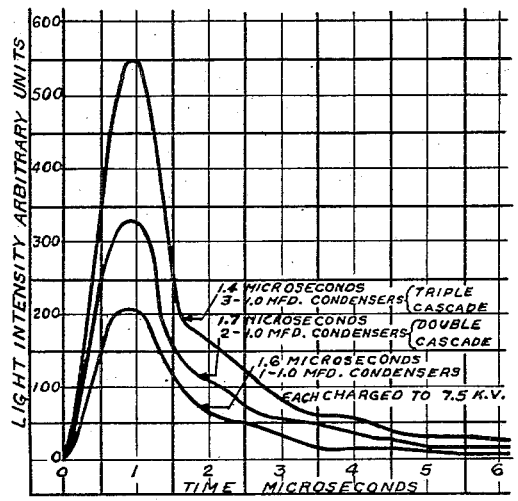
Fig. 7 is a graphical diagram on which light intensity is plotted against time for a single flash tube operated from a single capacitor and for double and triple cascade flash lamp circuits according to my invention.

Fig. 7 plots light intensity in arbitrary units approximately equal to megalumens against time measured in microseconds. The lowermost curve is that obtained from the discharge of a single 1.0 microfarad condenser charged to 7.5 kilovolts through one of the Mullard flash tubes above referred to and connected in a substantially conventional circuit. The two higher curves are those obtained with two and three stage cascade circuits constructed according to my invention and using components identical with the conventional circuit. It will be noted that in each case the light reached maximum intensity in less than one microsecond and that in each case the time which the light pulse remained at more than one-third of its peak intensity was very nearly the same (1.6 microseconds—single stage; 1.7 microseconds—two-stage cascade; and 1.4 microseconds—three-stage cascade). The components used in this test were assembled in simple "breadboard" models.

As a matter of interest, it may be noted that the light output as a function of time was studied by means of a transient photometer constructed as follows: An RCA Type 929 phototube having an S-4 response was coupled directly to the grid of one section of a 6SN7 dual triode wired as a cathode follower and the cathode follower output was fed into a Tektronix Model 514-D oscilloscope. The displayed transient was recorded through an F. 2.0 lens on Kodak Linograph Pan Film and developed for 8 minutes in full strength Kodak Dektol Developer. With this technique, light transients of five and ten microseconds' duration were successfully recorded. Linearity of response of the recording equipment was verified by exposing the photocell to flashes of light from a single stage flash lamp circuit charged to a known constant voltage for each test. A series of tests at this known voltage were made with neutral density filters reducing the light reaching the photocell by predetermined known amounts. In this way, it was determined that the output was linear over a range extending from 0.1 volt output signal to 0.4 volt output signal. In making the records presented here, the sensitivity of the apparatus was set up to provide a maximum output signal of 0.25 volt and all incoming light was reduced to that level by the use of standard neutral density filters of known transmission characteristics.

No simple way of providing a calibrating light pulse of high enough intensity and of known standard characteristics was discovered. As a substitute, a supply of General Electric midget flash bulbs (Type SM) were procured and with each set of tests several such flash bulbs were fired in sequence to establish a reference light level for that test. The peak intensity of these bulbs is stated by the manufacturer to be 0.8 megalumen and it has been found that from lamp to lamp their characteristics are fairly uniform. Using this reference level as 0.8 megalumen as specified by the manufacturer, the graphs are set up in terms of units intended to be equal to 1.0 megalumen but designated as arbitrary units approximately equal to 1.0 megalumen because of the lack of any absolute figures on the peak intensity of the reference source.

Figure 8:
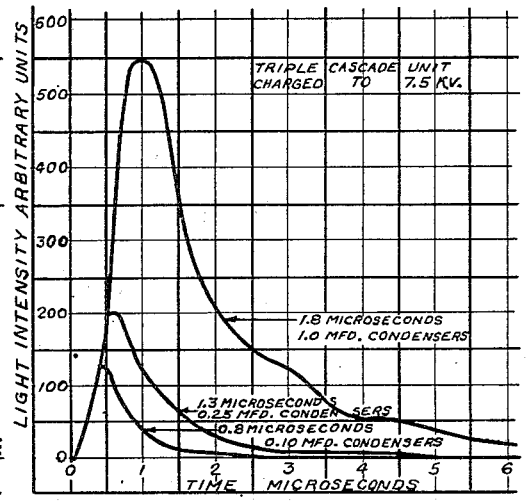
Fig. 8 is a graphical diagram on which light intensity is plotted against time for a triple cascade lamp circuit according to my invention. The effect of different-sized capacitors is shown on the three curves.

Fig. 8 plots light intensity in the same arbitrary units against time in microseconds. In this case, the components were assembled in laboratory apparatus corresponding to Figs. 10, 11, and 12 and were triple cascade lamp units charged to 7.5 kilovolts. In this case, the lowermost curve was obtained with three supply capacitors of 0.10 microfarad capacity, the intermediate curve with three supply capacitors of 0.25 microfarad capacity, and the uppermost curve with three supply capacitors of 1.0 microfarad capacity. Actually, the uppermost curve represents a test of the laboratory apparatus under substantially identical conditions to the test of the breadboard layout indicated by the uppermost curve in Fig. 7. Particularly in regard to peak intensity, the tests show very good consistency, although the total time in which the pulse was at greater than one-third peak intensity was 1.8 microseconds as compared to 1.4 microseconds in the previous test, possibly accounted for by some distributed inductance in the more complicated wiring layout of the laboratory apparatus which is arranged to permit easy substitution of capacitors of different capacity.

It will be noted from these comparisons that the time to reach peak intensity, the peak intensity, and the total time in which the light intensity exceeds one-third peak intensity, varies in fairly direct ratio to the size of the capacitor. In each case, it will be noted that the curve of decaying light intensity follows the exponential curve of a discharging capacitor and that the tendency to an oscillatory discharge indicated by the ripple in the curve is greatest with the larger capacitors. It should be fairly obvious that to maintain short light pulses, particularly with large capacitors, the connections should be short, of high current carrying capacity, and that the layout should be designed to keep the inductance in the circuit to the lowest possible values.

Figure 9:
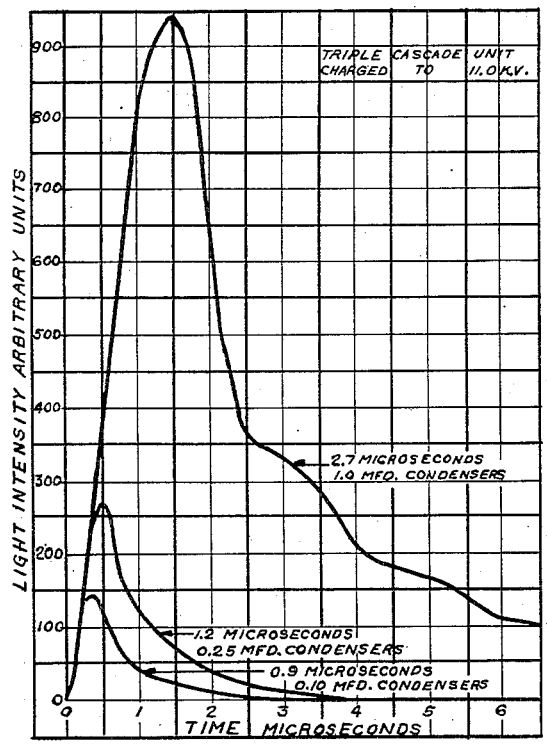
Fig. 9 is a graphical diagram similar to Fig. 8, showing the effect of charging the capacitors to a higher voltage.

After making certain minor modifications designed principally to reduce corona loss in the laboratory apparatus, further tests plotted in Fig. 9 were made with the same unit charged to 11.0 kilovolts. It will be apparent that under these conditions, sufficient light is available for making short exposures on the order of one or two microseconds even though using techniques that are inefficient in their utilization of light such as transient stress photographs in bifringent materials by means of polarized light. This latter technique with 60° crossed polaroids only transmits 2% of the incident light, yet I have achieved good results with exposures of less than two microseconds. By contrast, it is believed that the minimum available exposure for this type of work with commercially available equipment is about 40 microseconds.

*Capacitor charging*

Figure 2:
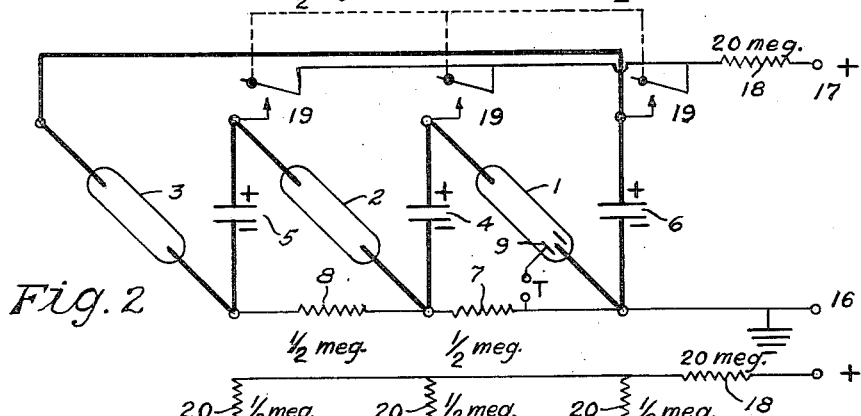
Fig. 2 is a schematic diagram of an improved circuit including capacitor charging means.

Returning now to refinements of the basic circuit, Fig. 2 shows one of the several means of charging the storage capacitors from an external high voltage supply connected to terminals 16 and 17. In this arrangement a resistor 18 of a suitably high value such as 20 megohms is employed to limit the charging current drawn from the supply and the capacitors may be connected simultaneously or sequentially to the supply by switches 19 shown ganged for convenience. Obviously, in constructing this arrangement, note should be taken of the fact that the charging voltage may be as high as 11.0 kilovolts or more with tubes of higher flash-over voltage and that during the limited conduction phase multiples of that voltage appear at certain points. Insulation, spacing, and corona loss must be considered.

Figure 3:
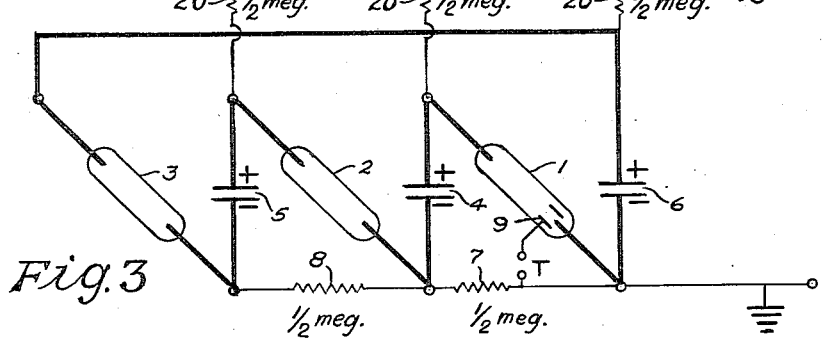
Fig. 3 is a schematic diagram of another improved circuit.

In Fig. 3, I have provided for charging the several capacitors through isolating resistors 20 which have the same function as the switches 19 but which, because of their relatively high value, may be left in the circuit without appreciably effecting the operation of the discharge circuit during the triggering phase as described relative to Fig. 1. Actually, their effect during the triggering phase is simply to provide additional parallel "keep alive" circuits. An additional advantage is that the continuous connection of the power supply makes it possible to supply the losses in the system and maintain the capacitors charged to the full voltage of the supply until it is desired to initiate the flash.

Figure 4:
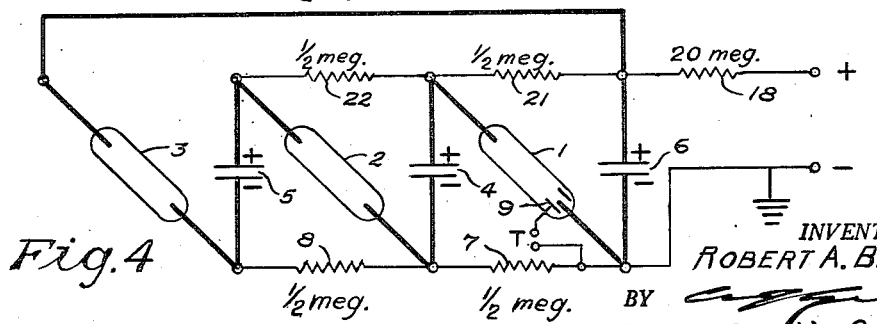
Fig. 4 is a schematic diagram of my preferred circuit including the rudimentary circuit of Fig. 1 and a simplification and improvement upon the modified circuit of Fig. 3.

Fig. 4 shows a further simplification of the circuit, eliminating one isolating resistor and providing more positively for sequential charging of the capacitors and lessened drain on the high voltage supply source. In this arrangement it will be noted that only the resistor 18 limits the charging current flowing to the capacitor 6 while, in addition to resistor 18, the sum of the resistors 7 and 21 is effective to limit the charging current to capacitor 4. Capacitor 5 is charged through additional resistance summing the values of resistors 8 and 22. By reason of the progressively greater resistance, the charging of capacitors 4 and 5 will be delayed until after capacitor 6 has been charged and the three or more capacitors will charge in sequence with a lower instantaneous drain on the supply source. Sequential triggering of this circuit follows the same sequence as described relative to Fig. 1, although it may be noted that probably both capacitors 4 and 6 contribute to the limited current in tube 1 during the sequential triggering phase, the currents being limited respectively by resistors 7 and 21.

*Trigger circuits*

In Fig. 5 I have shown one embodiment of a trip circuit for applying a triggering impulse to the electrode 9 of such flash lamps. This circuit consists of a power supply indicated generally by the reference numeral 23, which also applies specifically to the rectifier tube, a cathode follower circuit indicated generally by the reference numeral 24, and a Thyratron relay circuit indicated generally by the reference numeral 25, the reference numerals 24 and 25 also applying specifically to the tube in each unit. The power supply is so designed that a positive plate voltage is provided for the cathode follower circuit 24 and so that both positive and negative control voltages are provided, for example, these control voltages may be positive and negative 250 volts. The positive voltage supply is conventional and well filtered to provide a smooth plate supply for the cathode follower. Resistors 26 and 27 form a voltage divider to provide the 250 volt positive control voltage. Since there is negligible drain on the control voltages, the negative voltage may be supplied by half-wave rectification by such means as the selenium rectifier 28 and elaborate filtering is not necessary. Resistors 29 and 30 serve as a voltage divider to provide the negative 250 volt control voltage.

These control voltages are available at the input to the cathode follower circuit 24 and depending upon the setting of the selector switch 31 the trigger circuit will function when an external circuit between terminals 32 and 33 is either completed or interrupted.

With the selector switch in the "Make" position, the trigger circuit should function whenever an external circuit between terminals 32 and 33 is completed. In this position of the selector switch, it will be noted that the grid of cathode follower 24 is connected to ground through resistor 34 and to the negative control voltage through the parallel combination of resistor 35 and capacitor 36. With resistor 35 many times larger than resistor 34, it will be apparent that the grid is around 20 volts negative and that the remainder of the negative control voltage appears across resistor 35 and capacitor 36. When the two input terminals are shorted by an external circuit, as by the closing of a switch actuated by an event to be photographed, the terminal 32 is brought abruptly to ground potential from its former negative potential. Since it is impossible for the voltage across a capacitor to change instantaneously, this shift in the positive direction of about 250 volts in the potential of terminal 32 will be accompanied by an equal shift in the positive direction of the potential on the grid of cathode follower 24, that grid shifting from about negative 20 volts to about a positive 230 volts, with the result that a strong pulse of current flows in the cathode-plate circuit of the tube and the cathode becomes strongly positive. Capacitor 36 at once starts to discharge and after the pulse the grid of the cathode follower shortly returns to ground potential to terminate the pulse.

With the selector switch 31 in the "Break" position, the input terminal 32 is connected to the positive 250 volt control voltage but the terminals 32 and 33 are initially short-circuited so that both the grid of cathode follower 24 and the terminal 32 are at ground potential. It may be noted at this point that the resistors 26 and 29, in the power supplies, limit the current to such an extent that short circuits at the input terminals with either setting of the selector switch cannot overload the power supply.

The instant the circuit between terminals 32 and 33 is broken, as by severing a wire by the passage of the bullet to be photographed, the terminal 32 becomes 250 volts positive and this same positive voltage is supplied to the grid of the cathode follower, with the result that a strong current flows momentarily in the tube and a positive pulse is evident at the cathode. As the capacitor 36 charges, the grid becomes less positive and a steady state is reached with the grid around 20 volts positive.

The cathode follower 24, it will be realized, presents a low impedance to the coupling network to the following Thyratron stage 25 and it will be apparent that the positive pulses generated at the cathode of the cathode follower will be at once available to trigger the Thyratron.

Advantageously, the Thyratron may be a hydrogen Thyratron of high current carrying capacity and of the type which will remain non-conductive with the grid at cathode potential. A Type 4C–35 Thyratron has been found to be satisfactory in all respects.

Preferably, the plate of the Thyratron will be supplied from an external high voltage supply of any convenient type capable of producing about 12,000 volts. The plate of the Thyratron is shunted to ground through a circuit consisting of a capacitor 37 and a very high resistance 38 and it will be apparent that with the Thyratron non-conducting the capacitor will be charged to the full voltage of the power supply and the junction between capacitor 37 and resistance 38 will be at ground potential. This junction is arranged to be connected to the trigger electrode 9 of a flash tube 1.

When the Thyratron is fired by the application of a positive pulse to its grid, the effect is that of substantially instantaneously reducing the potential of the Thyratron plate to ground with the resistor 39 protecting the power supply. Since the capacitor 37 cannot discharge instantaneously, it follows that lowering the plate of the Thyratron to ground potential will have the effect of impressing a voltage of substantially the full magnitude of the high voltage supply between the trigger electrode and the adjacent cathode of the flash tube. A voltage of this magnitude applied between the trigger electrode and the cathode is sufficient to ionize the flash tube as previously pointed out.

Since the flash tube circuit which is the subject of my invention is capable of supplying the light for open-flash photographs of duration of about one microsecond, it follows that the usefulness of the system is dependent to a considerable extent upon the provision of means to generate accurately timed trigger pulses with minimum delay. Accordingly, the control voltages for the cathode follower should be high and all circuit components should be chosen to provide extremely sharp pulses which minimize the delay of the pulse in reaching the grid of the flash tube. Although I have illustrated this trigger circuit with actuation of the cathode follower only by the opening or closing of an external circuit, it will be apparent that known photo-electric, microphonic or other system may be utilized to initiate the trigger pulse.

In Fig. 6 I show another arrangement for utilizing a Thyratron 25 which may be fired as discussed above. In this case the pulse is the result of discharging the capacitor 40, charged as discussed above, through the primary of a pulse transformer 41 which steps up the voltage and applies the pulse to the trigger electrode 9 of a tube 1. Since the exemplary flash tube requires a minimum trigger pulse of 12.4 kilovolts and since the cascade light circuit becomes self-triggering above 11.0 kilovolts, the voltage step-up inherent in the circuit shown in Fig. 6 permits the use of a common high voltage supply for both triggering and capacitor charging. Because of the step-up properties of transformer 41, the circuit shown in Fig. 6 will function reliably as a trip circuit at a plate voltage as low as 7 kilovolts.

*Mechanical construction*

Figure 10:
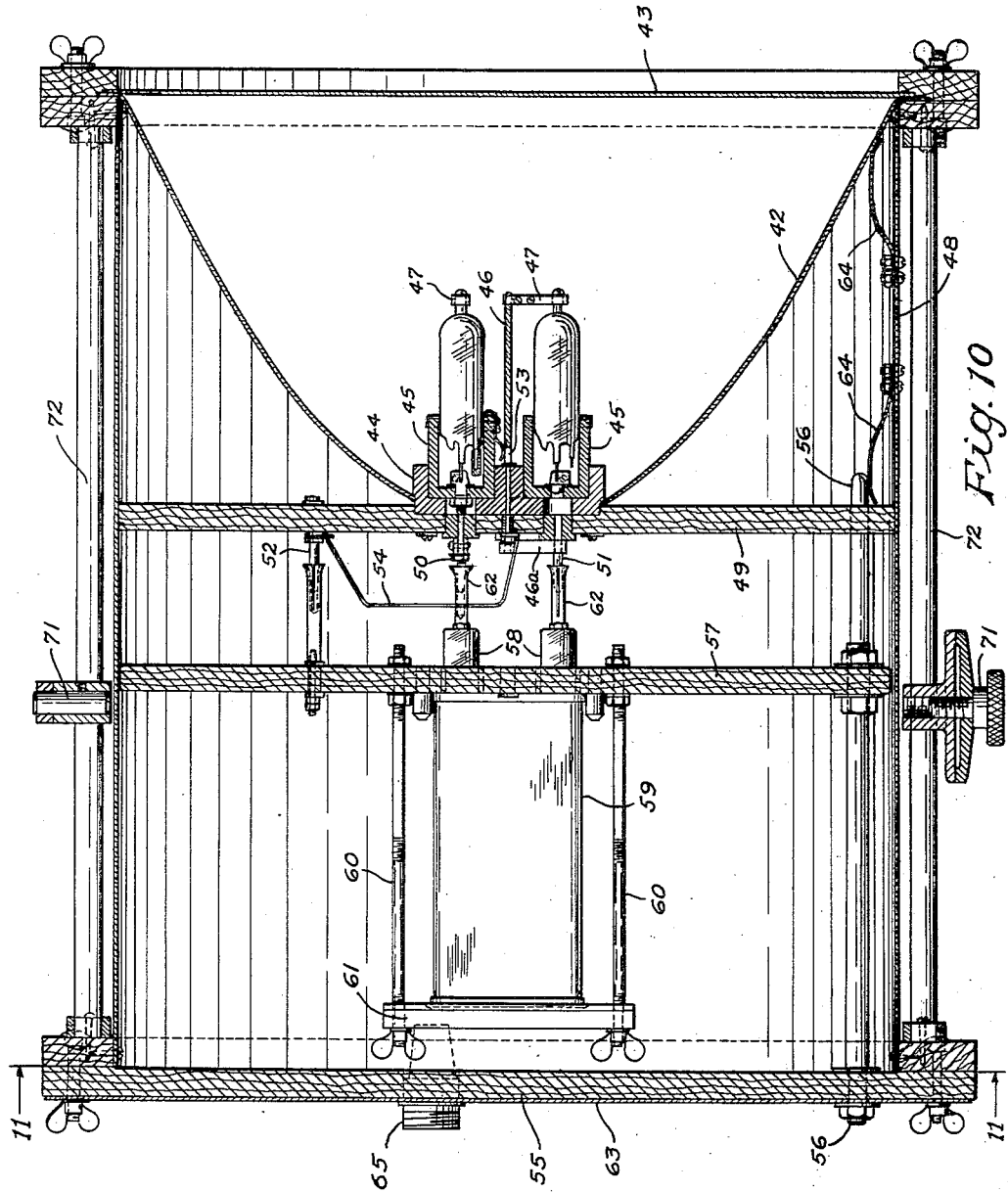
Fig. 10 is a sectional view through a lamp unit embodying my invention.

Although the mechanical construction of a unit embodying my basic circuit is not critical, I have found the arrangement shown in Figs. 10, 11, and 12 to be quite convenient and entirely satisfactory. Since flexibility in power was considered to be one of the most important design objectives, it was decided to provide for interchangeable use of three sizes of capacitors 1.0 microfarad, 0.25 microfarad, and 0.10 microfarad. To keep the size of the unit convenient, a three lamp or triple cascade circuit was chosen. Lastly, if high speed was to be achieved, it was necessary that the resistance and the inductance of the flash discharge circuit should be kept at a minimum.

Referring particularly to Fig. 10, there will be noted the reflector 42 and shatterproof safety shield 43. Nested in the reflector is a block 44 of insulating composition which mounts three flash lamps in special sockets 45 adapted to the particular lamps, it being noted that the preferred Mullard wireless flash lamps have their cathode and trigger electrodes brought out at the base of the lamp and their anode electrodes at the opposite end of the lamp, where flexible leads 46 are attached by clamps 47. The block 44 and the reflector 42 are supported in the housing 48 on a fixed disk 49 upon which there are supported six rearwardly extending pin connectors 50 and 51 leading respectively from the base connection and from the flexible leads 46 of the flash lamps and one pin connector 52 leading from the trigger electrode of one of the lamps by way of the socket terminal 53 and radially extending lead 54.

The rear end of the housing 48 is closed with a disk 55 removably secured to a flange on the housing and provided with three or more spaced rods 56 which support a third disk 57 within the housing. These rods 56 pass forward through holes in the disk 49 to serve as locating pins when the assembly of disks 55 and 57 is inserted into the housing.

The disk 57 is provided with three pairs of holes which receive the insulators 58 on the energy storage capacitors 59, the spacing between the capacitor terminals being identical with the spacing between the pairs of flash tube terminals 50 and 51, in which 50 is connected to the base or cathode terminal of one flash tube while 51 is connected with strap 46a, flexible lead 46, and clamp 47 to the upper or anode terminal of the preceding flash tube in the cascade chain. The capacitors are secured to the disk 57 with the insulators extending through the holes by means of rods 60 and rubber-faced bridging strips 61 which permit the interchangeable application of any set of three identical capacitors. Obviously, for interchangeability the position, height, and size of the insulators and terminals of the capacitors should be identical in all capacitors of any given capacity and in all sets of capacitors of other capacity. Pin sockets 62 are screwed onto the capacitor terminals to mate with the pins 50 and 51 on the disk 49, it being noted that the rods 56 are long enough to enter the holes in disk 49 and line up the assembly before the pins and sockets come together. Condensers are changed by removing the entire assembly of disks 55 and 57 from the housing 48 and inserting new capacitors. With the new set in place the assembly is re-inserted as a unit and all connections are thereby automatically remade at the pin connections.

Primarily to avoid the spurious triggering of chronographs and other sensitive electronic instruments which may be operating in the vicinity of such a unit, it is desirable to shield as completely as possible all portions of the discharge circuit. Accordingly, I prefer to have the housing 48 and reflector 42 of metal and to face the disk 55 with a sheet of metal 63, establishing an electrical contact between all such parts as by means of the grounding clips 64 and the rods 56.

Such electrical circuit elements as the charging and coupling resistors in the circuit of Fig. 4 may conveniently be located on both sides of the disk 49, it only being necessary to observe precautions as to spacing and insulation to avoid the dissipation of energy in corona discharge and other forms of leakage. Components of a trigger circuit such as that of Fig. 5 may be conveniently mounted in the space between disks 55 and 57 while the high voltage supplies for the trigger circuit and for the energy storage capacitors are most conveniently led in from external high voltage supplies through insulated leads such as 65.

As a safety measure to insure that the capacitors are discharged before their terminals are exposed by disassembly for changing capacitors, I provide the arrangement shown in Fig. 12 and in the portion broken away in Fig. 11. This arrangement comprises a shorting bar 66 pivotally mounted on stanchions 67 on disk 57 opposite each pair of capacitor terminals. This shorting bar is provided with a pair of spring fingers 68 and with a spring 69 acting to urge the fingers into contact with the pin sockets 62. When the capacitor assembly is fully inserted into the housing, each shorting bar is held to an inoperative position by engagement of the outer face of the shorting bar with a cam block 70 mounted on the rear face of the fixed disk 49. Obviously, when the capacitor assembly is to be removed from the housing the shorting bars will clear the cam blocks 70 and discharge the capacitors before the assembly is removed far enough to permit access to the capacitor terminals.

Since the sets of interchangeable capacitors differ materially as to weight, it is a convenience to mount the housing 48 for tilting upon trunnions 71, which trunnions may be slidably poistioned along rods 72 in positions providing for static balance of the housing assembly about the trunnion axis.

Although I have shown and described a preferred embodiment in some detail, I wish it to be understood that I do not consider my invention to be limited to any particular mechanical construction of the unit or to any particular trigger circuits, for either may be varied widely without departing from the principles of my invention.

Equivalent arrangements for other portions of the systems are possible and I wish it to be understood that I consider the specification as exemplary rather than as limiting the scope of my invention. For an exact definition of the limits which I place upon my invention, reference may be had to the appended claims in which I wish it to be understood that I regard combinations of two or more individual gaseous discharge lamps in series with each other and without interposed capacitors, but perhaps with shunt resistors, as substantial equivalents of the gaseous discharge lamps referred to in the claims. It should, however, be understood that in such an equivalent arrangement of two or more lamps in series to replace a single lamp, the flashover potentials of the individual lamps in each such equivalent combination should be fractions of the flashover potential of the single lamps referred to in the claims, the denominator of the fraction being substantially the same as the number of lamps included in each such equivalent combination. Similarly, I regard series and series parallel connected combinations of individual capacitors without interposed flash lamps as equivalents of the capacitors referred to in the claims.

I claim:

1. Apparatus for producing a resultant short duration light flash of very high intensity by timing and combining the lower intensity light flashes of a plurality of gaseous discharge photographic flash lamps, comprising a plurality of normally non-conductive gaseous discharge photographic flash lamps positioned and arranged so that the light flash from each illuminates a common area and connected in alternating sequence in a continuous series circuit with an equal number of energy storage capacitors each charged to a potential less than the normal flash-over potential of any one of said photographic flash lamps, and means to sequentially initiate conduction in said photographic lamps, said photographic flash lamps after initiation conducting current simultaneously to produce a single short duration photographic light flash which is effectively in intensity the summation of the light flash intensities of the individual flash lamps, including, without breaking the continuity of said series circuit, means to connect said capacitors in parallel to a source of potential for recharging said capacitors, said means of connecting the capacitors in parallel including isolating resistors of high ohmic value connected between said capacitors and said source of potential, said capacitors being progressively isolated from said source of potential by progressively greater total value of ohmic resistance in said isolating resistors, whereby said capacitors are charged progressively and in the order of their separation from said source, said means to initiate conduction in said lamps including a trigger electrode for one of said lamps, means to apply a triggering voltage pulse to said trigger electrode, a coupling resistor shunted across the said triggered flash lamp and the storage capacitor adjacent thereto in said series circuit; and coupling resistors shunted across succeeding series pairs of lamps and storage capacitors, said coupling resistors individually having a resistance many times greater than the effective resistance of an ionized flash lamp, said coupling resistors serving to connect together the capacitor electrodes bearing charges of like sign, said series circuit being grounded at one of the common junctions between a flash lamp, a storage capacitor, and a coupling resistor, means to connect a source of electrical potential for recharging said storage capacitors to the undgrounded junctions between said lamps and storage capacitors, said means to connect the recharging potential including isolating resistors individually having a resistance many times greater than the effective resistance of an ionized lamp, said source of potential being connected to one of said ungrounded junctions and said other ungrounded junctions being connected to each other and to the said first-mentioned ungrounded junction through the isolating resistors.

2. A device for producing a resultant short duration light flash of very high intensity by timing and combining the lower intensity light flashes of a plurality of gaseous discharge photographic flash lamps, comprising a plurality of gaseous discharge photographic flash lamps positioned and arranged so that the light emitted from each illuminates a common area, an equal number of energy storage capacitors, said photographic flash lamps and said capacitors connected in alternating sequence in an electrically continuous series circuit, a source of potential for charging said capacitors to a potential less than but approaching the normal flash-over potential of said individual photographic flash lamps; means to connect each alternate junction between a capacitor and a photographic flash lamp to one pole of said source of potential; means to connect the remaining junction between capacitors and photographic flash lamps to the other pole of said source of potential; and trigger means to initiate conduction in one of said gaseous discharge photographic flash lamps, said one pole of the source of potential being grounded and said alternate junctions connected thereto being connected to each other and to said pole through coupling resistors individually having a resistance many times greater than the effective resistance of an ionized flash lamp, said trigger means including a trigger electrode for one of said lamps, and means to apply to said trigger electrode a voltage high enough above ground potential to cause ionization to take place within said triggered lamp, said other pole of the source of potential being connected to one of said remaining junctions between capacitors and lamps, and the remainder of said remaining junctions being connected to each other and to said first-mentioned remaining junction through isolating resistors individually having a resistance many times greater than the effective resistance of an ionized flash lamp.

References Cited in the file of this patent
UNITED STATES PATENTS

| | | |
|---|---|---|
| 2,099,327 | Brasch et al. | Nov. 16, 1927 |
| 2,119,588 | Lindebald | June 7, 1938 |
| 2,186,013 | Edgerton | Jan. 9, 1940 |
| 2,221,573 | Bruckmann | Nov. 12, 1940 |
| 2,365,567 | Langer | Dec. 19, 1944 |
| 2,447,832 | Abend et al. | Aug. 24, 1948 |
| 2,478,907 | Edgerton | Aug. 16, 1949 |
| 2,485,037 | Clark | Oct. 18, 1949 |
| 2,492,850 | De Mers | Dec. 27, 1949 |
| 2,624,831 | Farber | Jan. 6, 1953 |
| 2,682,603 | Dine et al. | June 29, 1954 |